Figure 1:
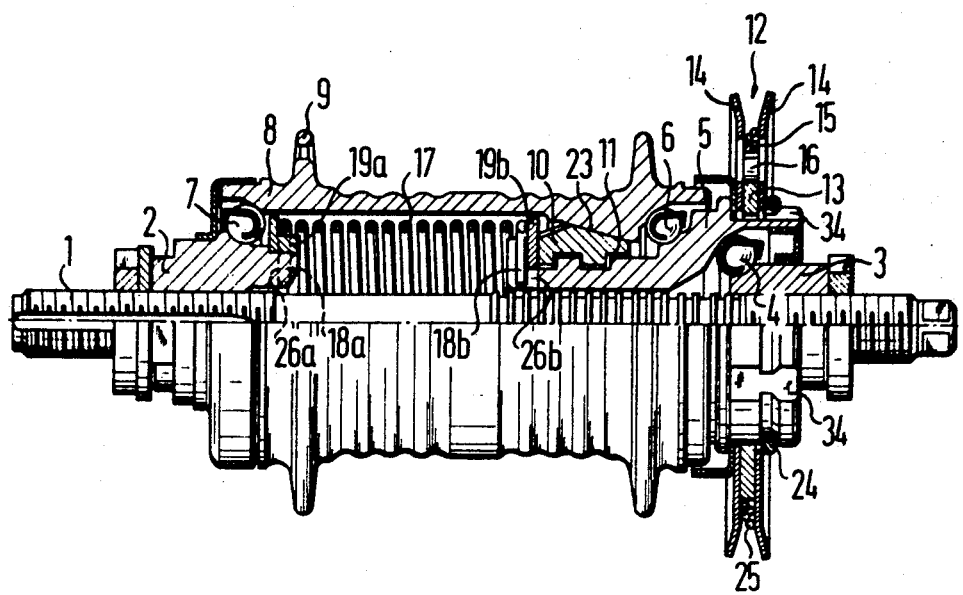

United States Patent [19]

Schulz

[11] 3,709,341
[45] Jan. 9, 1973

[54] ONE WAY CLUTCH DRIVEN BY OSCILLATING DRUM

[75] Inventor: Horst Schulz, Schweinfurt am Main, Germany

[73] Assignee: Fichtel & Sachs A G Schweinfurt am Main, Germany

[22] Filed: May 17, 1971

[21] Appl. No.: 143,941

[30] Foreign Application Priority Data

May 22, 1970 Germany............P 20 25 022.0

[52] U.S. Cl..................192/64, 74/142, 192/35, 280/240, 280/243
[51] Int. Cl.............................................F16d 41/36
[58] Field of Search.........192/41 R, 64; 74/142, 162; 280/243, 240, 251, 234

[56] References Cited

UNITED STATES PATENTS

| | | |
|---|---|---|
| 524,652 | 8/1894 | Risinger.........................192/41 R |
| 2,416,092 | 2/1947 | Genin..............................280/234 |
| 1,023,347 | 4/1912 | Whittington.....................192/6 R |
| 2,871,988 | 2/1959 | Wilkerson......................192/6 R X |
| 3,485,509 | 12/1969 | Searle.............................280/243 |

Primary Examiner—Benjamin W. Wyche
Attorney—Kelman and Berman

[57] ABSTRACT

A freewheeling hub for a vehicle wheel has a normally stationary shaft assembly and a driver and hub shell coaxially rotatable on the assembly. A coupling engaged in response to forward rotation of the driver connects the driver to the shell. One end of a flexible cable is wound on a cable drum fixed to the driver, and the cable, when pulled, turns the driver forward. A helical torsion spring in the shell is tensioned by such turning and returns the driver when tension in the cable is relaxed. A vehicle equipped with the hub is propelled when the cable is alternatingly pulled and released.

8 Claims, 5 Drawing Figures

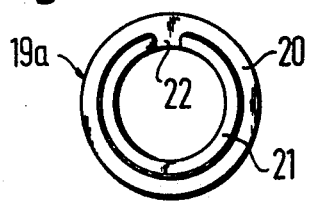
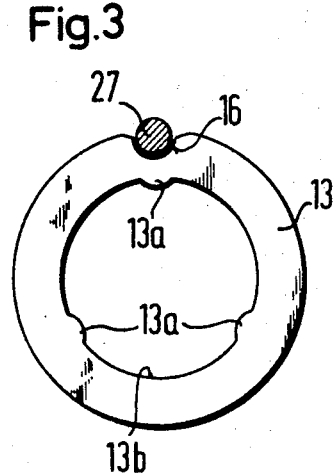
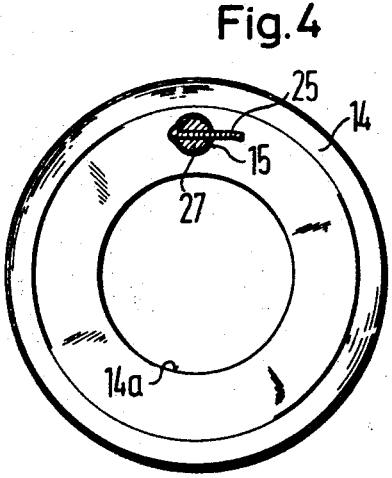
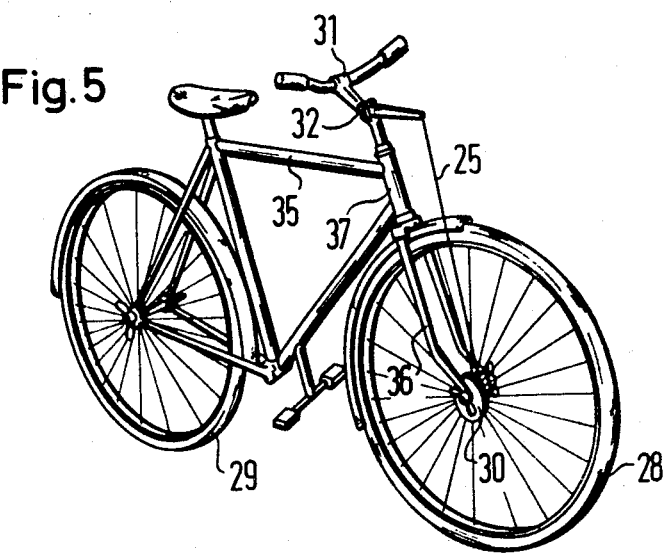

ONE WAY CLUTCH DRIVEN BY OSCILLATING DRUM

This invention relates to freewheeling hubs for vehicle wheels, and particularly to a hub in which a friction coupling operatively interposed between the hub shell and a driver transmits torque between the driver and the shell when the driver is rotated in a forward direction, but is released and permits free movement of the shell when the rotary speed of the shell exceeds that of the driver.

Such hubs are commonly employed in bicycles and similar vehicles. The driver is turned forward continuously or intermittently to propel the vehicle. It is also known to provide freewheeling hubs for vehicles which are actuated by manually moving a vehicle element forward and backward. The known freewheeling hubs adapted for use with such a reciprocating actuating member are quite complex and accordingly costly to assemble. They also consist of structural parts not found in the usual bicycle hubs, and such parts, necessarily manufactured in relatively small numbers, are more costly than the bicycle parts which are manufactured with all the cost advantages of long production runs.

It is a primary object of this invention to provide a freewheeling vehicle hub suitable for actuation by a reciprocating actuating mechanism which is simpler than the hubs employed heretofore for this purpose.

A concomitant object is the provision of a hub of the type described which embodies many elements also used in conventional bicycle hubs whose actuating mechanism rotates in one direction only for driving the hub.

With these and other objects in view, as will hereinafter become apparent, this invention resides in improvements in the conventional freewheeling hub which has a normally stationary shaft, a driver member and a hub shell supported on the shaft for rotation about the axis of the latter, a coupling mounted in the hub shell for transmitting torque between the driver member and the hub shell, the coupling including a coupling element which engages the driver member for threaded movement about the axis of the shaft, a brake which impedes rotation of the coupling element and thereby biases the element to move in an axial direction when when the driver member rotates about the shaft axis in one direction, hereinafter referred to as the forward direction, whereby respective faces of the coupling element and the hub shell are frictionally engaged when the driver member rotates in the forward direction, and an actuating mechanism which turns the driver member.

The modification of the known hub with which this invention is more particularly concerned relates to the actuating mechanism and includes an elongated, flexible tension element, such as a cable, chain, or rope, one end of which is wound on a drum assembly secured on the driver member for joint rotation. The other end of the tension element is free and may therefore be pulled to unwind the element from the drum assembly and thereby to turn the driver forward. Yieldably resilient means in the hub shell normally bias the driver member in a backward direction, that is, a direction opposite to the first-mentioned direction of rotation, so as to wind more of the tension element on the drum assembly.

Other features and many of the attendant advantages of this invention will readily become apparent as the same is better understood by reference to the following detailed description of a preferred embodiment when considered in connection with the appended drawing in which:

FIG. 1 shows a freewheeling hub of the invention in rear elevation and partly in section on its axis;

FIGS. 2, 3, and 4 respectively illustrate elements of the hub of FIG. 1 in side elevation and partly in radial section; and FIG. 5 shows a toy vehicle including the hub of FIG. 1 in a perspective view.

Referring now to the drawing in detail, and initially to FIG. 1, there is seen the front wheel hub of the vehicle illustrated in FIG. 5. The hub shaft 1 is normally fixedly fastened in the vehicle frame and stationary relative to the frame. The stationary shaft structure includes axially adjustable bearing members 2, 3 on the two axially terminal portions of the shaft 1. A ball bearing 4 on the bearing member 3 supports one end of a tubular driver 5 which also rotatably engages a central portion of the shaft 1 between the bearing members 2, 3. Additional ball bearings 6, 7 on the driver 5 and the bearing member 2 support respective axial end portions of the hub shell 8 which encloses a cavity of annular cross section about the central portion of the shaft 1. Two apertured radial flanges 9 on the hub shell are normally connected by spokes to a wheel rim in a manner illustrated in FIG. 5, but entirely conventional and not requiring description.

The driver 5 may be coupled to the hub shell 8 for torque transmission to the shell by a coupling member 10 having female square threads 11 engaging mating threads on the driver, the inclination or the threads 11 being such that the coupling member moves axially toward the right, as viewed in FIG. 1, when the driver 5 is rotated in a forward direction.

The driver fixedly carries a cable drum assembly 12 outside the shell 8. The drum assembly consists mainly of a central spacer ring 13 axially arranged between two lateral annular discs 14 of greater diameter. The ring 13 and one of the discs 14 are better seen in FIGS. 3 and 4. The disc 5 is partly received in the central apertures 13b, 14a of the drum components. An axial opening 15 in each disc 14 and a notch 16 in the ring 13 which is open in a radially outward direction are held in alignment by a pin 27 so that the three principal components of the drum assembly 12 rotate in unison. The assembly is secured against rotation on the driver 5 by conforming engagement of lugs 13a projecting from the inner circumference of the spacer ring 13 with axial grooves 34 of the driver 5 which are axially open to permit the drum assembly 12 to be slipped into position. The assembly is axially secured on the driver 5 by a snap ring 24 and a shoulder on the driver.

The coupling member 10 is biased toward the right, as viewed in FIG. 1, and toward engagement of respective conical friction faces 23 on the coupling member 10 and the hub shell 8 by a strong torsion spring 17 which is helical over almost its entire length and is coiled coaxially about the shaft 1 in the hub shell 8. The two ends 18a, 18b of the wire which forms the spring 17 are bent radially toward the common axis of the spring 17 and the shaft 1 and received in respective radial slots 26a, 26b of the bearing member 2 and the driver 5. When the driver 5 is rotated in a forward direction, the spring 17 is tensioned and returns the driver 5 to its initial position when the force turning the driver is relaxed.

Centering sleeves 19a, 19b are respectively mounted on the bearing member 2 and the driver 5. They are closely similar except for dimensional features. As is also shown in FIG. 2 for the sleeve 19a mounted on the bearing member 2, each sleeve has a radial flange portion 20 and a tubular hub portion 21. A radially open gap 22 in the hub portion 21 receives a radially bent end 18a, 18b of the spring 7, whereby the sleeves 19a, 19b are prevented from rotation about the hub axis relative to the supporting members 2,5. The spring 17 is axially compressed between the flange portions 20 in all operative conditions of the hub, and the hub portions 21 are received in and axially coextensive with the last turns at respective ends of the spring 17. The axial pressure of the spring 17 is transmitted to the coupling member 10 by the flange portion 20 of the sleeve 19b. The friction between the coupling member 10 and the associated sleeve 19b, which acts as a brake, impedes rotation of the coupling member about the hub axis.

A flexible steel cable 25 is partly wound on the drum assembly 12 in the groove bounded by the spacer ring 13 and the discs 14, and its end is fixedly attached to the afore-mentioned pin 27.

The hub described above in detail with reference to FIGS. 1 to 4 is shown at 30 in FIG. 5. It is mounted in the center of a front wheel 28 and connected to the rim of the wheel by spokes in the afore-described conventional manner, the wheel being secured in a carrier fork 36 by the shaft 1. The fork 36 is journaled in the head tube 37 of a tubular bicycle frame 35 in which a rear wheel 29 is also mounted in a conventional manner. A two-armed activating lever 31 is fulcrumed on the upper end of the fork 36 by a pivot pin 32 so that the lever swings approximately in the plane of rotation of the front wheel 28. One of the lever arms is shaped and positioned like a conventional handle bar, and the free end of the cable 25, not seen in FIG. 1, is attached to the other arm of the lever 31.

The vehicle shown in FIG. 5 is steered by turning the lever 31 together with the fork 37 about the axis of the head tube 37, and it is propelled by oscillating the lever 31 on the pivot pin 32 whose axis is parallel to that of the hub 30 and transverse to that of the head tube 37.

When the lever 31 is pivoted manually counterclockwise from the position seen in FIG. 5, the cable 25 is pulled and turns the drum assembly 12 and the driver 5, thereby tensioning the spring 17 and shifting the coupling member 10 on its threads 11 into the position illustrated in FIG. 1, whereby the rotation of the driver 5 is transmitted to the hub shell 8 and to the entire front wheel 28.

When the pressure on the lever 31 is relaxed, the spring 17 turns the driver 5 and the drum assembly 12 in a direction to wind more of the cable 25 on the drum assembly, and thereby to tilt the lever 31 clockwise. The rotation of the driver 5 is not fully transmitted to the braked coupling member 10 because of braking torque frictionally transmitted from the spring 17 to the coupling member by the fixed sleeve 19b. The coupling member 10 thus moves away from frictional engagement with the hub shell 8. The front wheel 28 rotates freely under inertial forces during the return stroke of the lever 31, and until the lever is again pivoted counterclockwise, whereupon another operating cycle may begin.

The hub 30 consists almost entirely of standard parts also employed in conventional, freewheeling bicycle hubs and available at very low cost because they are manufactured in large quantities. The few elements of the hub which are not stock items in a bicycle factory or a bicycle shop are simple and not critical in their dimensions. They are manufactured at low cost even in small lots.

The simplicity of the hub is evident from the drawing. It has been found to function reliably over extended periods under the unfavorable conditions normally encountered by toys in the hands of small children.

While the invention has been described with reference to a specific toy vehicle, it will be understood that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A freewheeling vehicle hub comprising
   a. a shaft member having an axis;
   b. a driver member and hub shell supported on said shaft member for rotation about said axis;
   c. coupling means mounted in said hub shell for transmitting torque between said driver member and said hub shell, the coupling means including a coupling element and thread means on said coupling element and on said driver member engaged for threaded movement of said coupling element about said axis;
   d. brake means for impeding rotation of said coupling element about said axis and for thereby biasing said coupling element to move in an axial direction when said driver member rotates about said axis in one direction,
      1. said coupling element and said hub shell having respective faces frictionally engaging each other when said driver member rotates in said one direction; and
   e. actuating means for turning said driver member, said actuating means including
      1. an elongated, flexible tension element,
      2. drum means secured to said driver member for joint rotation, said tension element having one end wound on said drum means and a free end, and
      3. yieldably resilient means in said hub shell for biasing said driver member to rotate in a direction opposite to said one direction and for thereby winding more of said tension element on said drum means.

2. A hub as set forth in claim 1, said yieldably resilient means including a substantially helical torsion spring having two ends, and securing means respectively securing said ends to said members against relative rotation.

3. A hub as set forth in claim 2, one of said securing means including a sleeve element having a radial flange portion axially abutting against said spring and a hub portion received in said spring and axially partly coextensive therewith.

4. A hub as set forth in claim 3, said hub portion being formed with an opening, one end of said spring passing through said opening and being locked to the member secured to said spring by said one securing means.

5. A hub as set forth in claim 1, said drum means including two disc members and a spacer member axially interposed between said disc members, a pin member received in respective axially aligned openings of said disc members and of said spacer member, and fastening means fastening said disc members and said spacer member on said driver member against relative rotation and axial movement, said wound end of said tension member being fastened to said pin member.

6. In a hub as set forth in claim 1, torque transmitting means frictionally interposed between said yieldably resilient means and said coupling element, said torque transmitting means and said yieldably resilient means jointly constituting said brake means.

7. A vehicle having a frame, a plurality of wheels on said frame, one of said wheels having a rim, a hub as set forth in claim 1, and spoke means holding said hub centered in said rim and connecting said hub and said rim for joint rotation, and pulling means on said frame engaging said free end for pulling the same against the restraint of said yieldably resilient means.

8. A vehicle as set forth in claim 7, further comprising a wheel carrier mounted on said frame for pivoting movement about a steering axis transverse to the axis of said shaft member, said shaft member being mounted on said wheel carrier, said pulling means including an actuating member mounted on said wheel carrier for pivoting movement about an axis transverse to said steering axis, said free end being fastened to said actuating member.

* * * * *